(12) United States Patent
Matsumoto

(10) Patent No.: US 11,933,984 B2
(45) Date of Patent: Mar. 19, 2024

(54) VIRTUAL IMAGE DISPLAY DEVICE AND OPTICAL UNIT

(71) Applicant: SEIKO EPSON CORPORATION, Tokyo (JP)

(72) Inventor: Daiki Matsumoto, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 396 days.

(21) Appl. No.: 17/388,436

(22) Filed: Jul. 29, 2021

(65) Prior Publication Data

US 2022/0035162 A1 Feb. 3, 2022

(30) Foreign Application Priority Data

Jul. 30, 2020 (JP) ................. 2020-129070

(51) Int. Cl.
*G02B 27/01* (2006.01)
*G02B 17/08* (2006.01)
*G02B 5/26* (2006.01)

(52) U.S. Cl.
CPC ........... *G02B 27/0172* (2013.01); *G02B 5/26* (2013.01); *G02B 17/08* (2013.01); *G02B 2027/0178* (2013.01)

(58) Field of Classification Search
None
See application file for complete search history.

(56) References Cited

U.S. PATENT DOCUMENTS

2014/0211146 A1 7/2014 Gupta et al.
2020/0018966 A1* 1/2020 Komatsu .................. G02B 5/10

FOREIGN PATENT DOCUMENTS

| CN | 104956253 A | 9/2015 |
| JP | 2010-145674 A | 7/2010 |
| JP | 2020-008749 A | 1/2020 |

\* cited by examiner

*Primary Examiner* — Bao-Luan Q Le
*Assistant Examiner* — Danell L Owens
(74) *Attorney, Agent, or Firm* — Oliff PLC

(57) ABSTRACT

An image light generation device generating image light, a semi-transmissive tilted mirror reflecting the image light from the image light generation device, and a concave semi-transmissive mirror reflecting, toward the semi-transmissive tilted mirror, the image light reflected by the semi-transmissive tilted mirror to form an exit pupil are provided, and the concave semi-transmissive mirror includes a partial reflective film having different reflectance according to wavelength, the semi-transmissive tilted mirror reflects the image light toward the partial reflective film.

17 Claims, 14 Drawing Sheets

VIRTUAL IMAGE DISPLAY DEVICE AND OPTICAL UNIT

The present application is based on, and claims priority from JP Application Serial Number 2020-129070, filed Jul. 30, 2020, the disclosure of which is hereby incorporated by reference herein in its entirety.

BACKGROUND

1. Technical Field

The present disclosure relates to a see-through type virtual image display device, and particularly to a virtual image display device and an optical unit of a type in which image light is reflected by a transmissive tilted mirror such that the light impinges on a concave transmissive mirror, and the reflection light from the concave transmissive mirror is observed through the transmissive tilted mirror.

2. Related Art

As a virtual image display device including a transmissive reflective surface and a concave mirror, a device including a prism member in which a transmissive reflective surface is incorporated is known, for example (see JP-A-2020-008749). It is disclosed that in this device, image light incident on the prism member is guided by totally reflecting it at a total reflection surface of the prism member toward the transmissive reflective surface, and the image light is reflected at the transmissive reflective surface toward the concave mirror disposed in front of the prism member.

In the virtual image display device disclosed in JP-A-2020-008749, the image light is emitted to the front side, and the image being displayed can be disadvantageously seen from the outside.

SUMMARY

A virtual image display device of an aspect of the present disclosure includes an image light generation device generating image light, a transmissive tilted mirror reflecting the image light from the image light generation device, and a concave transmissive mirror having a concave shape and reflecting, toward the transmissive tilted mirror, the image light reflected by the transmissive tilted mirror. The concave transmissive mirror includes a partial reflective film on which the image light reflected by the first mirror is incident, the partial reflective has different reflectance according to wavelength.

DESCRIPTION OF EXEMPLARY EMBODIMENTS

First Embodiment

With reference to FIGS. 1 to 4 and the like, a virtual image display device according to the present disclosure of the first embodiment and an optical unit incorporated in the virtual image display device are described below.

Figure 1:
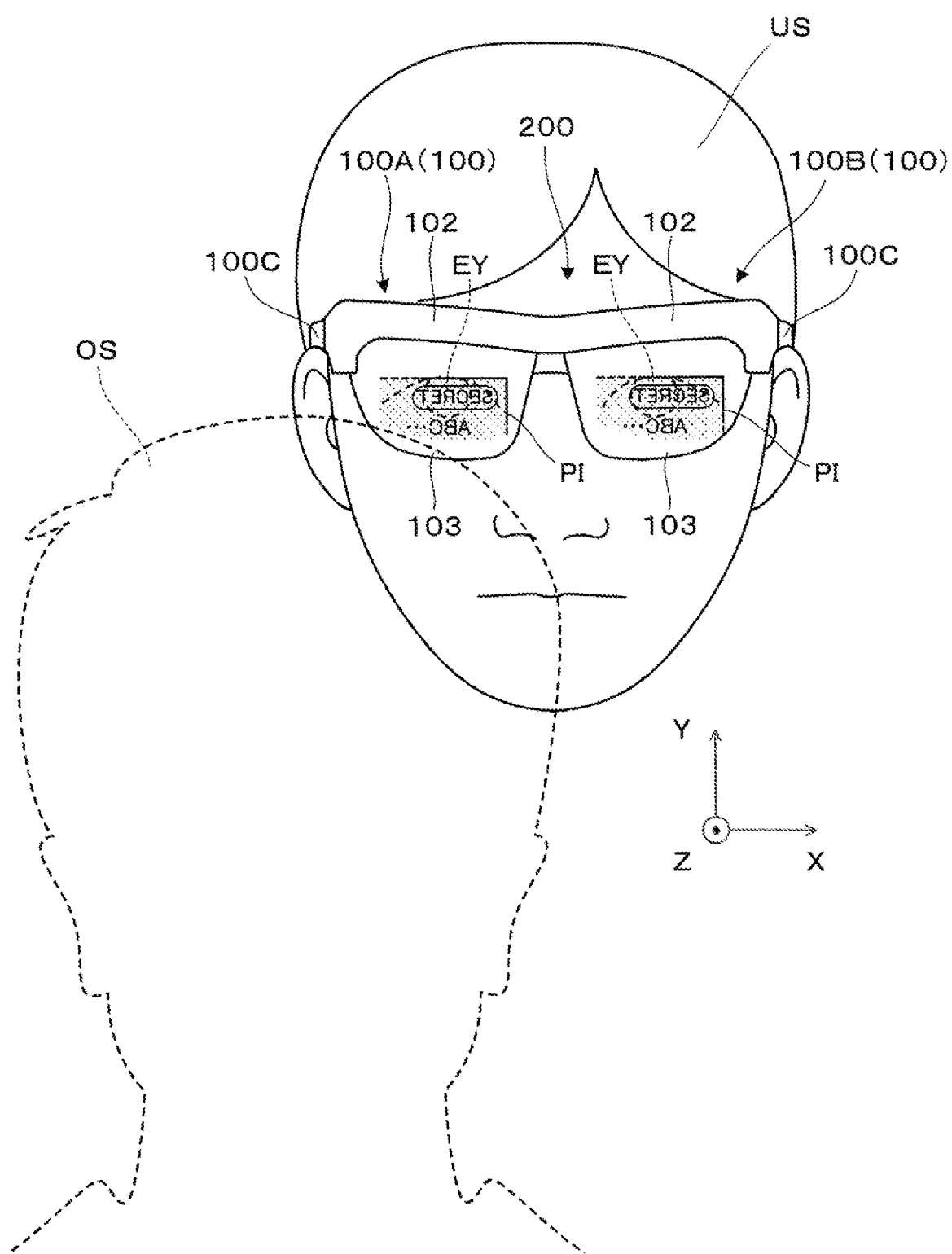
FIG. 1 is an exterior appearance view for describing a mounted state of a virtual image display device of a first embodiment.

FIG. 1 is a drawing for describing a mounted state of a head-mounted display (hereinafter referred to also as an HMD) 200, and with the HMD 200, a viewer or a wearer US wearing it can recognize an image as a virtual image. In FIG. 1 and the like, X, Y, and Z are orthogonal coordinate systems, the +X direction corresponds to the lateral direction in which eyes EY of the viewer or the wearer US wearing the HMD 200 or a virtual image display device 100 are located, the +Y direction corresponds to an upward direction orthogonal to the lateral direction in which the eyes EY are located for the wearer US, and the +Z direction corresponds to a forward direction or a front direction for the wearer US. The ±Y direction is parallel to the vertical axis or the vertical direction.

The HMD 200 includes a right-eye first display device 100A, a left-eye second display device 100B, and a pair of temple-shaped support devices 100C that supports the display devices 100A and 100B. The first display device 100A is composed of a display driving part 102 disposed in the upper part, and an exterior member 103 with an eyeglass-lens shape that covers the front side of the eye. Likewise, the second display device 100B is composed of the display driving part 102 disposed in the upper part and the exterior member 103 with an eyeglass-lens shape that covers the front side of the eye. The support device 100C supports the upper end side of the exterior member 103 through the display driving part 102. The first display device 100A and the second display device 100B are optically reversed left and right, and therefore the right-eye first display device 100A is described as a representative of the virtual image display device 100.

Figure 2:
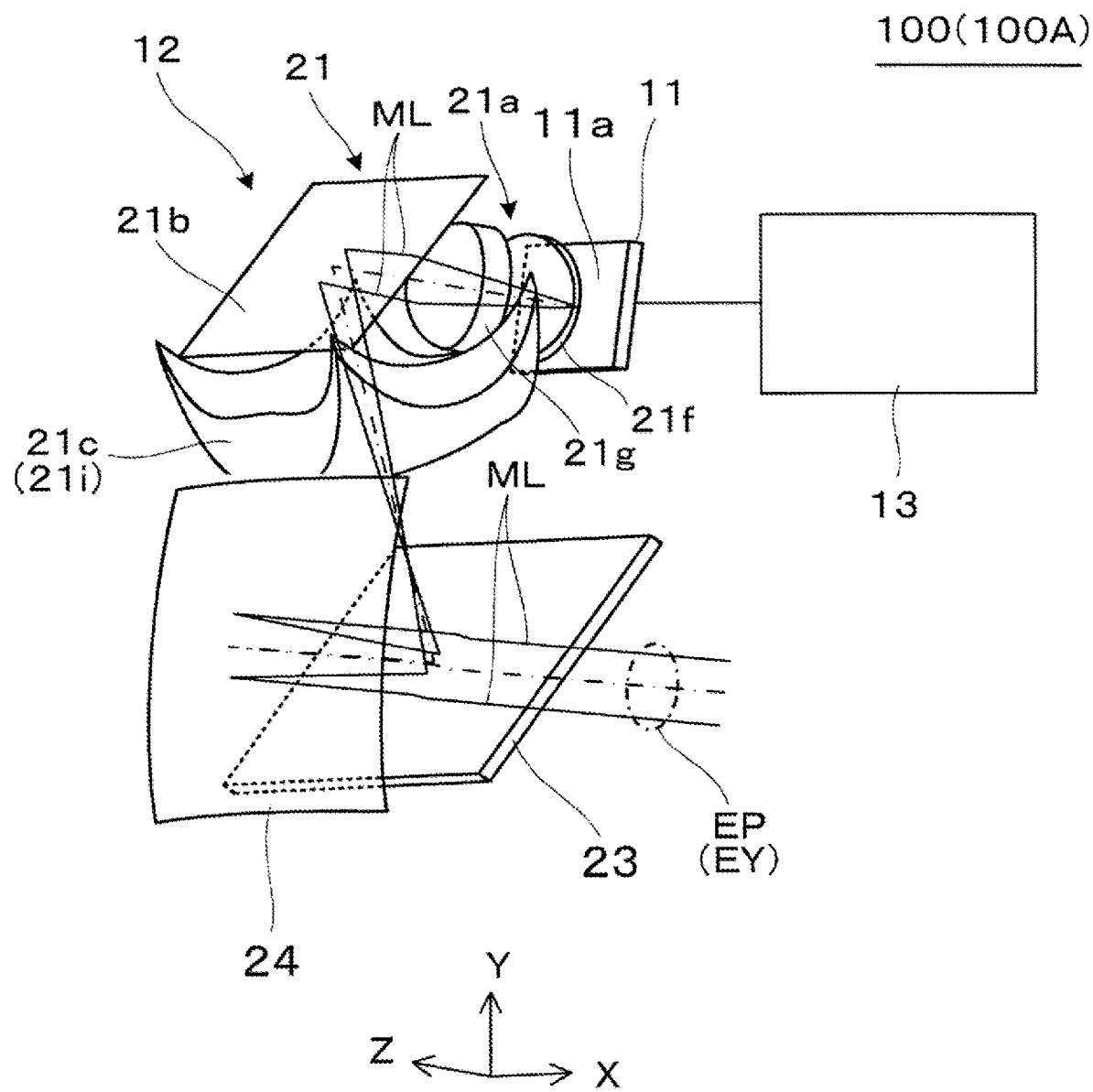
FIG. 2 is a schematic perspective view for describing a structure of the virtual image display device of FIG. 1.
Figure 3:
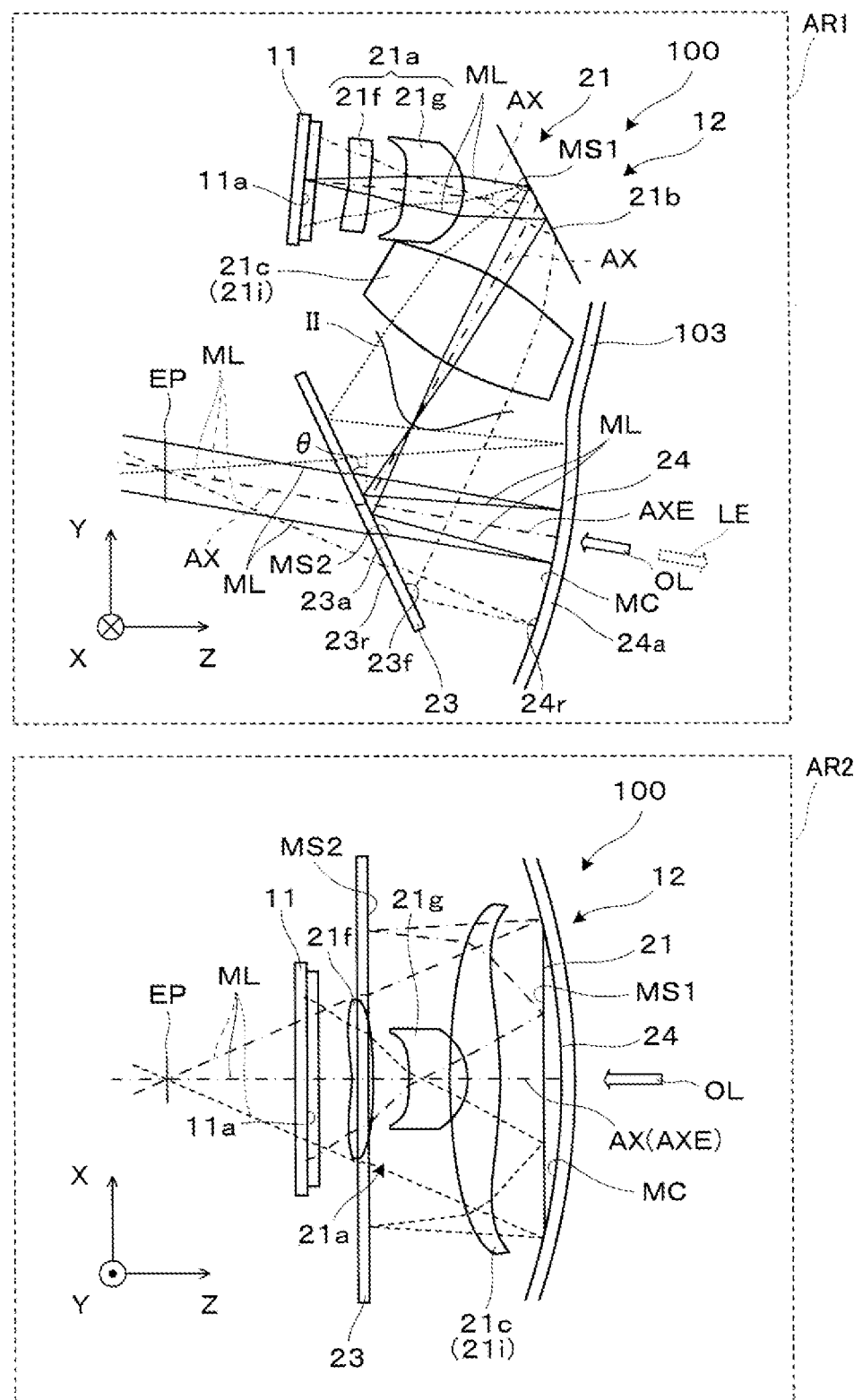
FIG. 3 is a side sectional view and a partial sectional plan view of the virtual image display device of FIG. 1.

FIG. 2 is a perspective view for describing the virtual image display device 100 serving as the right-eye display device 100A, and FIG. 3 is a drawing for describing an optical structure of the virtual image display device 100. In FIG. 3, a first region AR1 is a side sectional view of an image light generation device 11 and an optical unit 12, and a second region AR2 is a plan view illustrating a partial cross section along light paths of the image light generation device 11 and the optical unit 12.

As illustrated in FIG. 2, the virtual image display device 100 includes the image light generation device 11, the optical unit 12 and a display control circuit 13. It should be noted that, in this specification, one in which the display control circuit 13 is omitted is also referred to as the virtual image display device 100 from the viewpoint of achieving the optical function. The image light generation device 11 and the display control circuit 13 are supported in the outer frame of the display driving part 102 illustrated in FIG. 1, and a part of the optical unit 12 is also supported in the outer frame of the display driving part 102.

The image light generation device 11 is a self-luminous display device. The image light generation device 11 is, for example, a micro LED display, and forms a color still picture or moving image on a two-dimensional display surface 11a. The image light generation device 11 performs a display operation by being driven by the display control circuit 13. The image light generation device 11 is not limited to a micro LED display, and may be replaced by a display device using an organic electroluminescence (organic EL), an inorganic EL, an organic LED, a laser array, a quantum dot light emission element and the like. The image light generation device 11 is not limited to a self-luminous image light generation device, and may be a device composed of a light modulation element such as an LCD and configured to form an image by illuminating the light modulation element using a light source such as a backlight. As the image light generation device 11, a liquid crystal on silicon (LCOS (registered trademark)), a digital-micromirror-device and the like may be used in place of an LCD.

As illustrated in FIG. 2 and FIG. 3, the optical unit 12 includes a projection optical system 21, a transmissive tilted mirror 23, and a concave transmissive mirror 24. The term "transmissive mirror" of the concave transmissive mirror 24 means that it is a mirror that partially transmits light. Here, the light path from the image light generation device 11 to the projection optical system 21 is disposed on the upper side of the transmissive tilted mirror 23. To be more specific, the image light generation device 11 and the projection optical system 21 are disposed in a space sandwiched between a tilted plane extended from the transmissive tilted mirror 23 and a vertical plane extended upward from the upper end of the concave transmissive mirror 24.

The projection optical system 21 projects image light ML emitted from the image light generation device 11. The projection optical system 21 converges the image light ML emitted from the image light generation device 11 to form an image, and then injects it into the transmissive tilted mirror 23. That is, the projection optical system 21 is disposed between the image light generation device 11 and the transmissive tilted mirror 23 on the light path. The projection optical system 21 includes a first lens system 21a, a turning mirror 21b and a second lens system 21c. The first lens system 21a includes two lenses, 21f and 21g, in the example illustrated in FIG. 3, but may be composed of one lens or three or more lenses. The second lens system 21c includes one lens 21i in the example illustrated in FIG. 3, but may be two or more lenses. The lenses 21f, 21g and 21i may be spherical lenses, non-spherical lenses, free curved surface lenses, and the like. The turning mirror 21b is a plate-shaped optical member, and includes a flat reflective surface MS1. The flat reflective surface MS1 of the turning mirror 21b is composed of a metal film or a dielectric multilayer film. The flat reflective surface MS1 is obtained by forming a reflective film composed of a single film or a multilayer film made of metal such as Al or Ag or other materials by vapor deposition and the like on a flat plate surface. The turning mirror 21b bends an optical axis AX in a direction of an acute angle smaller than 90° in the YZ plane. The image light ML that travels through the first lens system 21a in the +Z direction, which is the forward direction, is bent by the turning mirror 21b in an oblique and rear downward direction between the −Y direction and the −Z direction, and then the light impinges on the transmissive tilted mirror 23 through the second lens system 21c.

The transmissive tilted mirror 23 is an optical member in a form of a flat plate, and includes a flat reflective surface MS2 having transmissivity. The transmissive tilted mirror 23 is a mirror in which a metal film or a dielectric multilayer film formed as a transmissive reflective film is formed on one surface 23f of a parallel flat plate 23a having a uniform thickness and transmissivity, and the transmissive reflective film functions as the flat reflective surface MS2. The reflectance and transmittance of the flat reflective surface MS2 is set to approximately 50%, for example. It is to be noted that an anti-reflective film is formed on another surface 23r of the parallel flat plate 23a. The transmissive tilted mirror 23 bends the optical axis AX in a substantially orthogonal direction in the YZ plane. The image light ML that travels in a direction slightly tilted rearward with respect to in the −Y direction, which is a downward direction, through the first lens system 21a of a projection optical system 21 is bent by the transmissive tilted mirror 23 in a direction slightly tilted downward with respect to the +Z direction, which is the forward direction, and then the light impinges on the concave transmissive mirror 24. The transmissive tilted mirror 23 is disposed between the concave transmissive mirror 24 and an exit pupil EP where the eye EY or the pupil hole is located, so as to cover the exit pupil EP. The transmissive tilted mirror 23 can be directly or indirectly fixed to the outer frame of the display driving part 102 illustrated in FIG. 1 such that the positional relationship with the concave transmissive mirror 24 and the like can be appropriately set.

With respect to the XY plane extending in the vertical direction as a reference, the transmissive tilted mirror 23 or the flat reflective surface MS2 are tilted by an angle θ=approximately 20 to 40° in the counterclockwise direction around the X axis as viewed from the −X side (see the lateral sectional view of FIG. 3). As described above, the transmissive tilted mirror 23 is disposed such that the angle between the Y axis, which is a vertical axis, and the transmissive tilted mirror 23 is smaller than 45°. When the angle between the Y axis and the transmissive tilted mirror 23 is greater than 45°, the transmissive tilted mirror 23 is tilted than the standard (normal) state, and the thickness in the Z-axis direction increases, whereas when the angle between the Y axis and the transmissive tilted mirror 23 is smaller than 45°, the transmissive tilted mirror 23 is raised than the standard (normal) state, and the thickness of the transmissive mirror in the Z-axis direction is reduced. That is, by setting the angle between the Y axis and the transmissive tilted mirror 23 to an angle smaller than 45° as in the present embodiment, an installation where the transmissive tilted mirror 23 largely protrudes in the −Z direction of the back surface with respect to the concave transmissive mirror 24 as a reference can be avoided, and the increase of the thickness of the virtual image display device 100 or the optical unit 12 in the Z direction in the front-rear direction can be avoided.

The concave transmissive mirror 24 is an optical member having a shape recessed to the exit pupil EP, and includes a partial reflective surface MC having transmissivity. The concave transmissive mirror 24 has a light convergence function, collimates the image light ML reflected and scattered at the transmissive tilted mirror 23, and enters the light into the exit pupil EP through the transmissive tilted mirror 23. The concave transmissive mirror 24 includes a surface recessed to the exit pupil EP and a convex surface toward the external side that is obtained by inverting a recessed surface, and thus has a uniform thickness while having a curved shape. A plate-shaped member 24a of the concave transmissive mirror 24 is a base material that defines the external shape of the concave transmissive mirror 24. The plate-shaped member 24a has a transmissivity for transmitting light without a substantial loss. A metal film or a dielectric multilayer film is formed as a partial reflective film on one surface 24r of the plate-shaped member 24a, and such a partial reflective film functions as the partial reflective surface MC having a concave shape. The partial reflective surface MC is not limited to a spherical surface, and may be an aspherical surface or other axisymmetric curved surface. The image light ML travelling forward after being reflected by the transmissive tilted mirror 23 is reflected back to the transmissive tilted mirror 23 by the concave transmissive mirror 24 such that the light is partially transmitted through the transmissive tilted mirror 23 and collected at the exit pupil EP. An emission light axis AXE from the transmissive tilted mirror 23 toward the concave transmissive mirror 24 coincides with the optical axis AX folded back at the concave transmissive mirror 24 toward the exit pupil EP. The image light ML impinges on the entirety of the transmissive reflective surface MC of the concave transmissive mirror 24 from a substantially perpendicular direction, and has a high optical symmetry. The concave transmissive mirror 24 covers the transmissive tilted mirror 23 on the external side. The transmissive tilted mirror 23 is disposed between the concave transmissive mirror 24 and an exit pupil EP where the eye EY or the pupil hole is located, so as to cover the exit pupil EP. In the optical system illustrated in the drawing, the emission light axis AXE, which is an axis line from the transmissive tilted mirror 23 toward the concave transmissive mirror 24 and is also an axis line from the concave mirror 24 toward the center of the exit pupil EP, extends with a downward tilt of approximately 10° with respect to the +Z direction as the forward direction. With the emission light axis AXE tilted downward on the front side at approximately 10° with respect to the Z axis, which is a horizontal axis, the fatigue of the eye EY of the wearer US observing virtual images can be reduced.

The partial reflective surface MC may be a free curved surface, but when the partial reflective surface MC is an axisymmetric curved surface, it is easier to give the partial reflective surface MC the desired reflection property.

The concave transmissive mirror 24 is incorporated to constitute a part of the transmissive exterior member 103 illustrated in FIG. 1. That is, by providing a transmissive or non-transmissive plate-shaped member in an extended manner around the concave transmissive mirror 24, the exterior member 103 including the concave transmissive mirror 24 can be achieved. The exterior member 103 is not limited to the eyeglass-lens form, and may have various outlines or exterior appearances.

Regarding the light paths, the image light ML from the image light generation device 11 is focused and bent by the projection optical system 21 to form an image, and then impinges on the transmissive tilted mirror 23. The image light ML that is reflected by, for example, approximately 50% at the transmissive tilted mirror 23 impinges on the concave transmissive mirror 24 so as to be almost completely reflected by the partial reflective surface MC. The image light ML reflected at the concave transmissive mirror 24 passes through the transmissive tilted mirror 23 and impinges on the exit pupil EP where the eye EY or the pupil hole of the wearer US is located. Here, the exit pupil EP is an eye point of the optical unit 12 where the eye EY is assumed to be disposed, and light from each point of the display surface 11a of the image light generation device 11 impinges in a collected manner in one place at an angle that allows observation of virtual images. Between the transmissive tilted mirror 23 and the projection optical system 21, an intermediate image II is formed. The intermediate image II is an image obtained by appropriately enlarging an image formed on the display surface 11a of the image light generation device 11. External light OL transmitted through the concave transmissive mirror 24 also impinges on the exit pupil EP. That is, the wearer US wearing the HMD 200 can observe a virtual image of the image light ML superimposed on external images.

It is to be noted that while the concave transmissive mirror 24 transmits the external light OL, it also slightly transmits the image light ML, and thus generates leaked light LE on the front side of the concave transmissive mirror 24. If the intensity of the leaked light LE is high, a third party OS existing around the wearer US can observe a part PI of the image displayed on the display surface 11a of the image light generation device 11 (see FIG. 1). In contrast, in the present embodiment, as described later, the partial reflective surface MC suppresses the leaked light LE in the concave transmissive mirror 24, and thus the situation where the part PI of the image can be observed by the third party OS is avoided.

A structure of the concave transmissive mirror 24 is described below with reference to FIG. 4. The concave transmissive mirror 24 includes the plate-shaped member 24a that is a supporting member for maintaining the entire shape, the partial reflective film 24b formed on the inner side (the exit pupil EP side in FIG. 3) of the plate-shaped member 24a, and an anti-reflective film 24c formed on the external side of the plate-shaped member 24a.

From the viewpoint of ensuring the strength of the shape, the concave transmissive mirror 24 or the plate-shaped member 24a has a thickness of 1 mm or greater, but preferably has a thickness of 2 mm or smaller from the viewpoint of weight reduction. The plate-shaped member 24a is formed by injection molding using an optically transparent resin material, for example.

The partial reflective film 24b functions as the partial reflective surface MC and reflects the image light ML at a desired reflectance. The partial reflective film 24b is one called a band reflection filter or a notch filter, and has a high reflectance in a plurality of wavelength bands. The partial reflective film 24b may be formed of a dielectric multilayer film. To be more specific, several types of metal oxide films are stacked in the film thickness based on the optical design, on the first surface 2a of the plate-shaped member 24a. In this manner, the reflectance of the partial reflective film 24b can be set to approximately 100% in the RGB display wavelength region corresponding to the wavelength spread of the image light ML, and the image light ML can be reflected at the partial reflective film 24b without waste. On the other hand, the reflectance of the partial reflective film 24b can be set to a value substantially equal to 0% in other wavelength regions of the visible range corresponding to the wavelength deficiency of the image light ML, and thus a situation where the partial reflective film 24b blocks the external light OL can be avoided as much as possible. It is to be noted that the partial reflective film 24b may not be directly formed on the plate-shaped member 24a. For example, the plate-shaped member 24a may be covered with a hard coat film and the transmissive reflective film 24b may be formed on top of that.

The partial reflective film 24b is not limited to the above-mentioned dielectric multilayer film, and may be formed of a multilayer film combined with a metal film.

Figure 5:
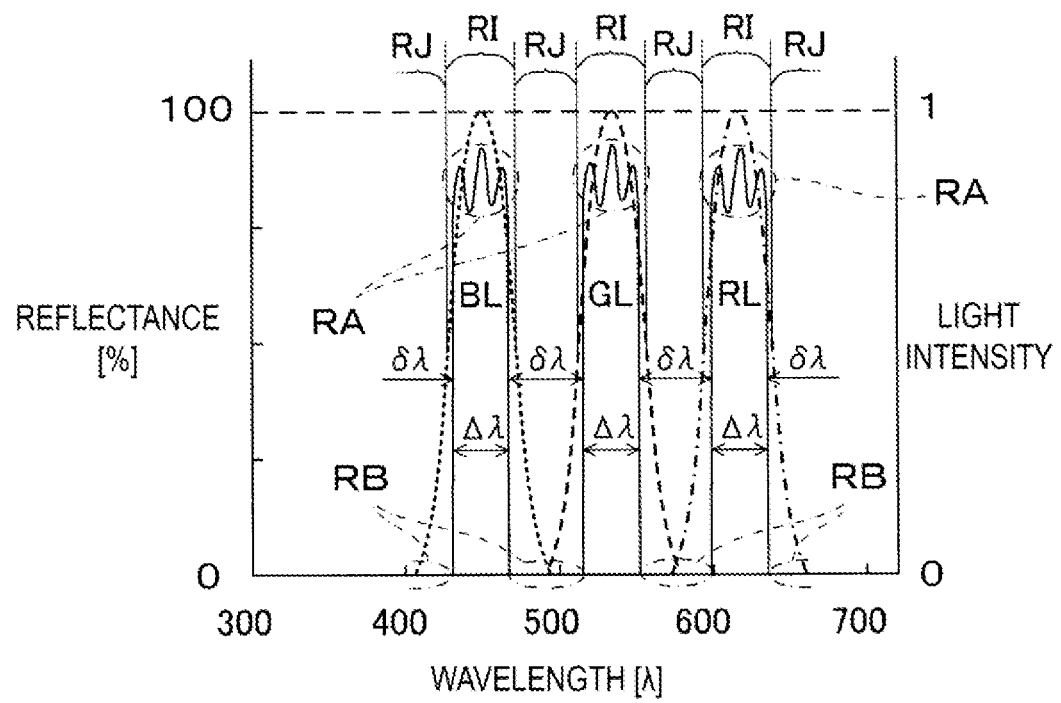
FIG. 5 is a chart showing a wavelength property of image light and a reflection property of a partial reflective film.

FIG. 5 is a chart showing a wavelength property of the image light ML emitted from the image light generation device 11 and a reflection property of the partial reflective film 24b. In this chart, the abscissa indicates the wavelength (nm), and the ordinate indicates the reflectance (%) or the light intensity (arbitrary unit). It is to be noted that while the peak values of the light intensities of the colors are equal to each other for convenience of description, this does not mean that the actual light intensities of the colors are equal to each other. That is, the actual light intensities of RGB have peak values different from each other.

The image light ML emitted from the image light generation device 11 has a wavelength distribution property that depends on the light emission property of the micro LED that constitutes the image light generation device 11. The image light ML has an intensity equal to or greater than a predetermined value in a display wavelength region RI of each color of the RGB. On the other hand, the image light ML emitted from the image light generation device 11 has an intensity equal to or smaller than a predetermined value in another wavelength region RJ in the visible range excluding the display wavelength region RI. To be more specific, the display wavelength region RI of a blue component BL of the image light ML is 427 to 472 nm in wavelength, the display wavelength region RI of a green component GL of the image light ML is 512 to 557 nm in wavelength, and the display wavelength region RI of a red component RL of the image light ML is 594 to 638 nm in wavelength. The display wavelength region RI may be defined based on the half value of the peak value of the image light ML, for example, but this is not limitative, and the display wavelength region RI may be defined based on 30% of the peak value, for example.

The reflection property of the partial reflective film 24b has a reflection property portion RA including the maximum value of the reflectance and having a function as a reflective film in the display wavelength region RI of each of the RGB. The reflectance of the partial reflective film 24b is set to a reflectance of approximately 80 to 90% in the reflection property portion RA in each display wavelength region RI, and set to 0 to several percent in a region between the RGB or the other wavelength region RJ on the outside thereof. This means that the partial reflective film 24b has a wavelength distribution, and the reflectance in the display wavelength region RI corresponding to the image light ML is higher than the reflectance in the other wavelength region RJ in the visible range excluding the display wavelength region RI. In the example illustrated in the drawing, the reflectance in the reflection property portion RA varies in accordance with the wavelength, but it may have a property with a larger variation, or a flat or uniform property with a smaller variation. In addition, the reflectance in the portion of a reflection property portion RB excluding the reflection property portion RA may not be uniform at a value close to 0%, and may vary in accordance with the wavelength in a reflectance range close to 0%. Examples of the method for adjusting the reflectance and the transmittance of the partial reflective film 24b include adjusting the number of layers of the dielectric multilayer films that constitute the partial reflective film 24b, slightly shifting the film thickness of the dielectric multilayer film from an appropriate design value on the assumption that the appropriate value is, for example, $\lambda/4$ with respect to the wavelength $\lambda$, and adjusting the film formation method and/or the film formation condition.

It is to be noted that desirably, the reflectance of the partial reflective film 24b is set to approximately 80 to 90% or more in the entirety of the display wavelength region RI of the RGB, but may be reduced at an end portion of the display wavelength region RI. In the example illustrated in the drawing, the reflectance of the partial reflective film 24b is also reduced to zero at both ends of the display wavelength region RI. Specifically, it is desirable that a wavelength width $\Delta\lambda$ of the reflection property portion RA be close to the wavelength width of the display wavelength region RI from the viewpoint of suppressing the leakage of the image light ML, but is slightly smaller than the wavelength width of the display wavelength region RI of each color of the RGB from the viewpoint of reducing attenuation of the external light OL. The wavelength width of the display wavelength region RI, which depends on the light emission property of the light-emitting element that constitutes the image light generation device 11, is adjusted to, specifically, 30 nm to 50 nm for example, and the wavelength width $\Delta\lambda$ of the reflection property portion RA is set to, specifically, 10 nm to 30 nm for example although it depends on the performance of the partial reflective film 24b. For the reflectance of the image light ML of each color, it is necessary to take into account the reflectance of the reflection property portion RA and the reflectance of the reflection property portion RB. In the case where the wavelength width $\Delta\lambda$ of the reflection property portion RA is smaller than the display wavelength region RI, and the reflectance of the reflection property portion RB is substantially zero as in the present embodiment, the wavelength width $\Delta\lambda$ is the effective wavelength range of the display surface 11a, i.e., the light source. On the other hand, in the case where the wavelength width $\Delta\lambda$ of the reflection property portion RA is wider than the display wavelength region RI, and the reflectance of the reflection property portion RB is substantially zero, almost all the light from the display surface 11a, i.e., from the light source, is utilized. The average transmittance of the external light is calculated by:

$$\{(100-\alpha_B) \times \Delta\lambda_B + (100-\alpha_G) \times \Delta\lambda_G + (100-\alpha_R)\Delta\lambda_R\} \chi \\ (\Delta\lambda_B + \Delta\lambda_G + \Delta\lambda_R) + \{(100-\alpha_1) \times \delta\lambda_1 + (100-\alpha_2) \times \\ \delta\lambda_2 + (100-\alpha_3) \times \delta\lambda_3 + (100-\alpha_4) \times \lambda_4\} \chi (\delta\lambda_1 + \delta\lambda_2 + \\ \delta\lambda_3 + \delta\lambda_4)$$

where $\alpha_B$, $\alpha_G$ and $\alpha_R$ are the reflectances in the three reflection property portions RA, $\Delta\lambda_B$, $\Delta\lambda_G$ and $\Delta\lambda_R$ are the wavelength widths of the three reflection property portions RA, $\alpha_1$, $\alpha_2$, $\alpha_3$ and $\alpha_4$ are the reflectances of the four reflection property portions RB excluding the three reflection property portions RA, and $\delta\lambda_1$, $\delta\lambda_2$, $\delta\lambda_3$ and $\delta\lambda_4$ are the wavelength widths of the four reflection property portions RB.

In the case where the image light generation device 11 is composed of a laser array, the wavelength width of the display wavelength region RI is smaller than a case of a diode array. In addition, in the case where the image light generation device 11 is composed of an organic EL array, the wavelength width of the display wavelength region RI is wider than a case of a diode array. Even with the image light generation device 11 using an organic EL array, the wavelength width can be freely adjusted by adjusting the wavelength property of the color filter associated with the pixel.

With the reflectance of the partial reflective film 24b set to a maximum of approximately 80 to 90% or greater in the display wavelength region RI, or the reflection property portion RA set to a reflectance of approximately 80 to 90% or greater, the image light ML is substantially reflected with almost no waste, and the reflection efficiency of the concave transmissive mirror 24 for the image light ML is increased. In addition, with the reflectance of the partial reflective film 24b set to substantially 0% in the other wavelength region RJ between the RGB, the light other than the image light ML, e.g., the external light OL, is transmitted with a small loss, and the see-through property of the concave transmissive mirror 24 is increased. It is to be noted that also in the case where the reflectance of the partial reflective film 24b is, for example, as low as approximately 10% to 20% or smaller in the other wavelength region RJ, the light other than the image light ML is considered to be substantially transmitted.

Returning back to FIG. 4, the anti-reflective film 24c reduces reflection of the image light ML partially passed through the partial reflective film 24b from traveling backward and forming ghosts. The anti-reflective film 24c is a dielectric multilayer film. The anti-reflective film 24c is formed by stacking several types of metal oxide films in the film thickness based on the optical design, on a second surface 2b of the plate-shaped member 24a. It is to be noted that it is not necessary to form the anti-reflective film 24c directly on the plate-shaped member 24a. For example, the plate-shaped member 24a may be covered with a hard coat film and the anti-reflective film 24c may be formed on top of that.

In the virtual image display device 100 of the first embodiment described above, the concave transmissive mirror 24 includes the partial reflective film 24b having a wavelength distribution on the inner side that faces the transmissive tilted mirror 23, and therefore the image light ML transmitted through the partial reflective film 24b and emitted toward the external side can be suppressed, and, the image being displayed is less seen from the outside, thus increasing of the effect of suppressing information leakage. In particular, with the partial reflective film 24b having a wavelength distribution, the transmissivity can be ensured for the wavelength other than the intended wavelength, and thus a see-through property can be ensured. It is to be noted that through the use of the transmissive tilted mirror 23, the weight of the optical system of the virtual image display device 100 can be reduced in comparison with a case where a prism member is used.

In particular in the first embodiment, the partial reflective film 24b has such a property that the reflectance in the display wavelength region RI corresponding to the image light ML is higher than the reflectance in the other wavelength region RJ, and thus the ease of the observation of the external light OL can be increased through transmission at the partial reflective film 24b while increasing the ease of the observation of the image light ML through the reflection at the partial reflective film 24b. In addition, in the present embodiment, the partial reflective film 24b substantially transmits the light of the other wavelength region RJ, and thus the transmittance of the external light OL at the partial reflective film 24b can be increased as much as possible in a wavelength range that does not affect the image light ML.

Second Embodiment

A virtual image display device of a second embodiment is described below. The virtual image display device and the like of the second embodiment are obtained by partially changing the virtual image display device of the first embodiment, and therefore the description for the common portions is omitted.

Figure 6:
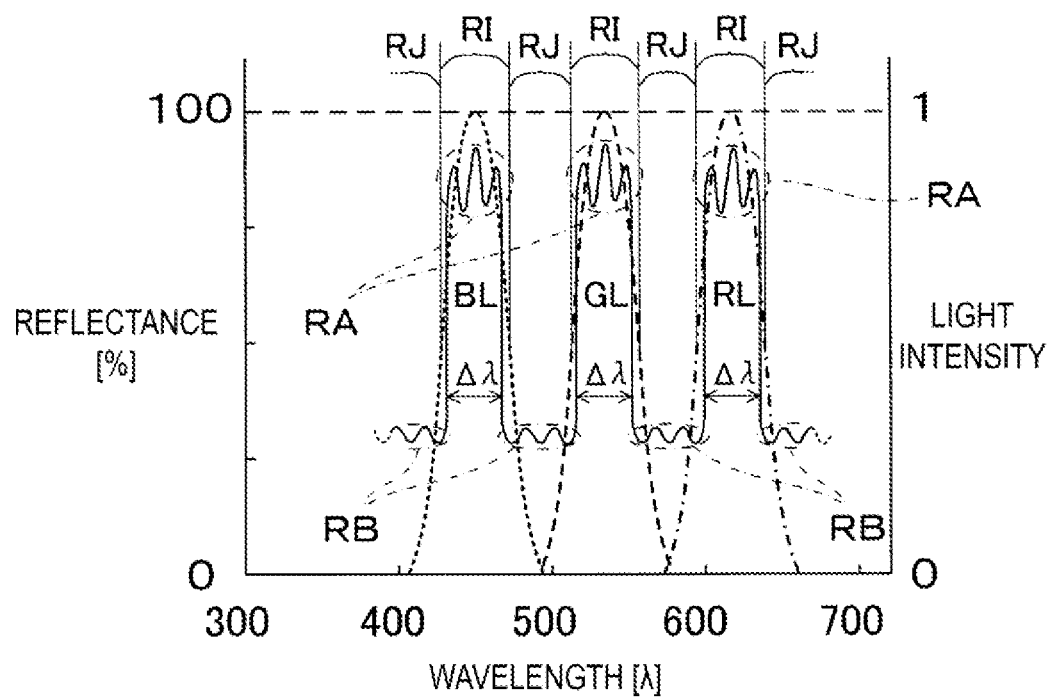
FIG. 6 is a drawing for describing a reflection property and the like of a partial reflective film of a second embodiment.

FIG. 6 is a drawing for describing a feature of the second embodiment, with a modification in the reflectance of the partial reflective film 24b of the first embodiment illustrated in FIG. 5. The reflection property of the partial reflective film 24b includes the reflection property portion RA including the maximum value of the reflectance and having a function as a reflective film in the display wavelength region RI of each of the RGB, and a transmission property portion RB having a function as a transmissive film in a region between the RGB or the other wavelength region RJ on the outside thereof. The reflectance of the partial reflective film 24b is set to approximately 80 to 90% (see the reflection property portion RA) in the display wavelength region RI of each color, and set to approximately 20 to 70% (see the transmission property portion RB) in a region between the RGB or the other wavelength region RJ on the outside thereof.

In the example illustrated in the drawing, the reflectance of the reflection property portion RA varies in accordance with the wavelength, but it may have a property with a larger variation, or a flat or uniform property with a smaller variation. In addition, the reflectance also varies in accordance with the wavelength in the transmission property portion RB, but it may have a property with a larger variation, or a flat or uniform property with a smaller variation.

Setting the reflectance of the partial reflective film 24b to approximately 20 to 70% in the other wavelength region RJ, or setting the transmission property portion RB to approximately 20 to 70% means that the partial reflective film 24b partially transmits and partially blocks the light of the other wavelength region RJ. In this case, the transmittance of the external light OL at the partial reflective film is ensured in a wavelength range that does not affect the image light ML, and thus this configuration ensures the see-through property of the concave transmissive mirror 24.

In the virtual image display device 100 of the second embodiment described above, the partial reflective film 24b partially blocks the light of the other wavelength region RJ, and thus the transmittance of the external light OL at the partial reflective film 24b can be ensured in a wavelength range that does not affect the image light ML.

Third Embodiment

A virtual image display device of a third embodiment is described below. The virtual image display device and the like of the third embodiment are obtained by partially changing the virtual image display device of the first embodiment, and therefore the description for the common portions is omitted.

Figure 7:
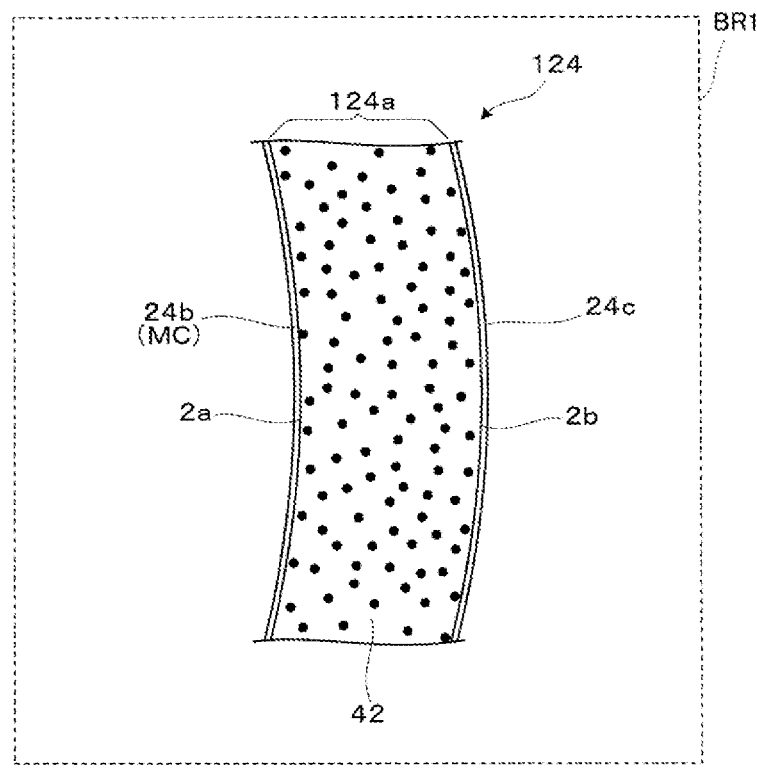
FIG. 7 is an enlarged sectional view illustrating a concave transmissive mirror of a third embodiment.
Figure 7:
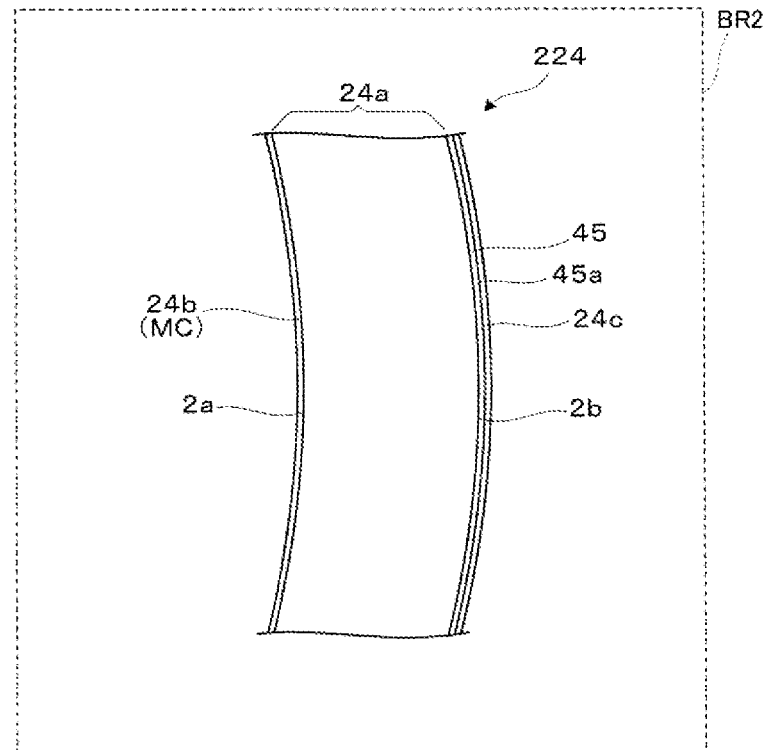

FIG. 7 is a drawing for describing a structure of a concave transmissive mirror incorporated in the virtual image display device of the third embodiment. In FIG. 7, a first region BR1 is an enlarged sectional view illustrating a structure of a concave transmissive mirror 124 of a first example incorporated in the virtual image display device of the third embodiment, and a second region BR2 is an enlarged sectional view illustrating a structure of a concave transmissive mirror 224 of a second example.

In the first example illustrated in the first region BR1 of FIG. 7, a plate-shaped member 124a is an emission light absorption member 42, and suppresses emission, to the external side, of emission light passed through the partial reflective film 24b. With the plate-shaped member 124a, i.e., the emission light absorption member 42, desired light reduction, such as reduction of the transmittance to ½, can be achieved. The emission light absorption member 42 is composed of a material in which an absorber is dispersed in a base material of a resin, or more specifically, the emission light absorption member 42 is formed by including nano particles having a size of approximately 10 to 100 nm made of metal or the like in the resin. Here, when nano particles dispersed in the emission light absorption member 42 absorbs light with a good balance among three colors of RGB, the light reduction can be achieved while maintaining the color tone of the transmitted light. The transmittance of the emission light absorption member 42 can be adjusted by adjusting the density of the nano particles in the emission light absorption member 42 and the like. The metal nano particles are not limited to a single metal, and may be also be an alloy or the like. The emission light absorption member 42 is not limited to one in which nano particles are dispersed in a base material of a resin, and one in which inorganic pigment and/or organic pigment is mixed in a resin may be used. In this case, color mixing can be achieved by selecting and blending the pigments. Further, resins with carbon fiber kneaded into them can also be used.

Figure 8:
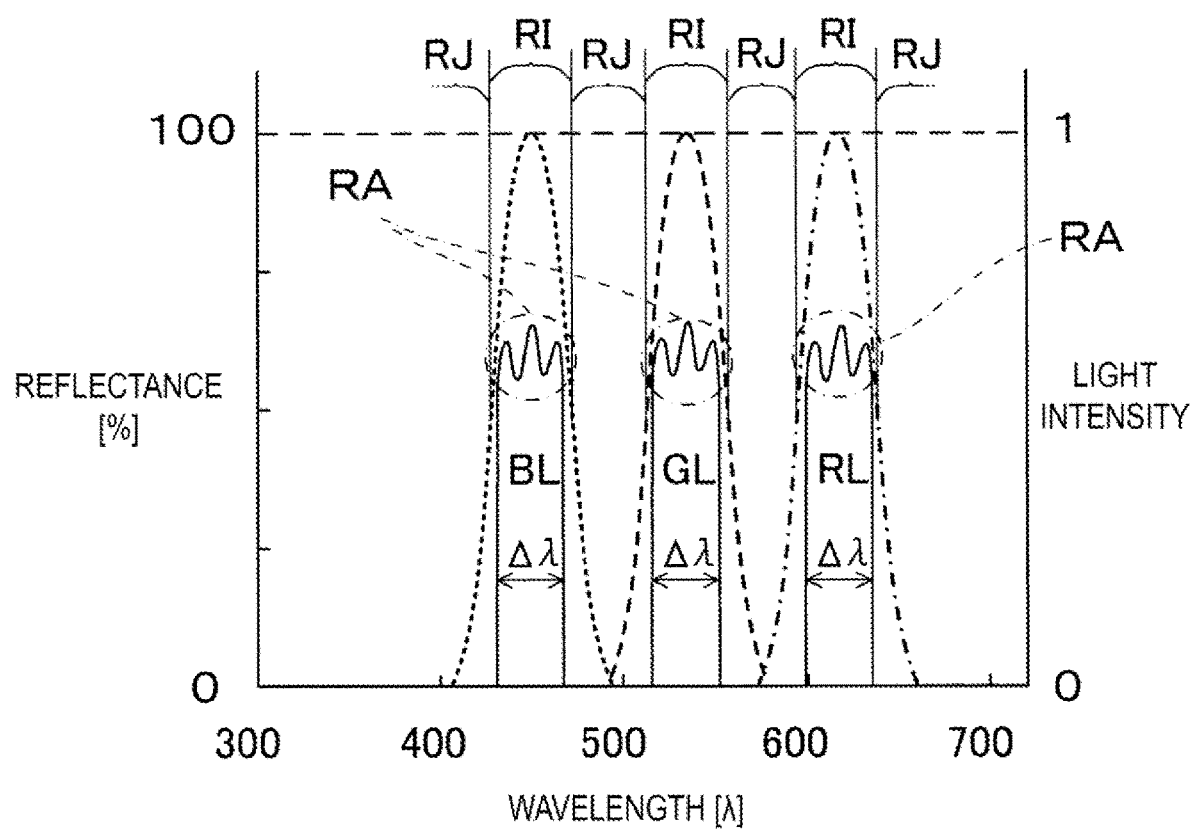
FIG. 8 is a drawing for describing a reflection property and the like of a partial reflective film of the third embodiment.

FIG. 8 is a drawing for describing a property of the concave transmissive mirror 124 incorporated in the virtual image display device of the third embodiment, with a modification in the reflectance of the partial reflective film 24b of the first embodiment illustrated in FIG. 5. In the case of the third embodiment, as the reflection property of the partial reflective film 24b, the reflectance of the reflection property portion RA having a function as a reflective film is set to approximately 20 to 70% in the display wavelength region RI of each of the RGB. In this case, the concave transmissive mirror 124 partially transmits the external light OL of each display wavelength region RI, and thus the observation of the external light OL over the entire wavelength range can be achieved. Meanwhile, the intensity of the image light ML transmitted through the partial reflective film 24b and emitted to the outside is relatively high. In view of this, in the emission light absorption member 42, the plate-shaped member 124a disposed outside the partial reflective film 24b is caused to function as the emission light absorption member 42. With the emission light absorption member 42, the image light ML transmitted through the partial reflective surface MC and emitted to the external side is reduced, and the image being displayed is less seen from the outside.

In FIG. 8, the display wavelength regions RI of the RGB have the same reflectance, but the reflectance may be relatively different between the RGB.

In the second example illustrated in the second region BR2 of FIG. 7, the concave transmissive mirror 224 includes the plate-shaped member 24a that is a supporting member, the partial reflective film 24b formed on the inner side of the plate-shaped member 24a, an emission light absorption film 45 formed on the external side of the plate-shaped member 24a, and an anti-reflective film 24c formed on the external side of the emission light absorption film 45.

The emission light absorption film 45 functions as an absorption film that suppresses emission, to the external side, of emission light passed through the partial reflective film 24b. With the emission light absorption film 45, desired light reduction, such as reduction of the transmittance to ½, can be achieved. The emission light absorption film 45 may be formed by forming a metal thin film on the external side surface of the resin that constitutes the plate-shaped member 24a, for example. The metal thin film is formed as a multilayer film by vapor deposition, sputtering and the like using materials such as metals such as Ag, Cr and Al and dielectric materials, for example. The emission light absorption film 45 may be formed also by dipping the external side surface of the resin that constitutes the plate-shaped member 24a into dye, for example. By dipping it into several types of dye, the light reduction can be achieved while maintaining the color tone of the transmitted light. Further, the emission light absorption film 45 may be formed by coating it with an organic material colored in grey, and may also be formed by pasting films of polyester or other resins colored in grey.

It is to be noted that the anti-reflective film 24c is formed on the external side surface 45a of the emission light absorption film 45. The anti-reflective film 24c may be formed on the emission light absorption film 45 covered with a hard coat film.

Fourth Embodiment

A virtual image display device of a fourth embodiment is described below. The virtual image display device and the like of the fourth embodiment are obtained by partially changing the virtual image display device of the first embodiment, and therefore the description for the common portions is omitted.

Figure 9:
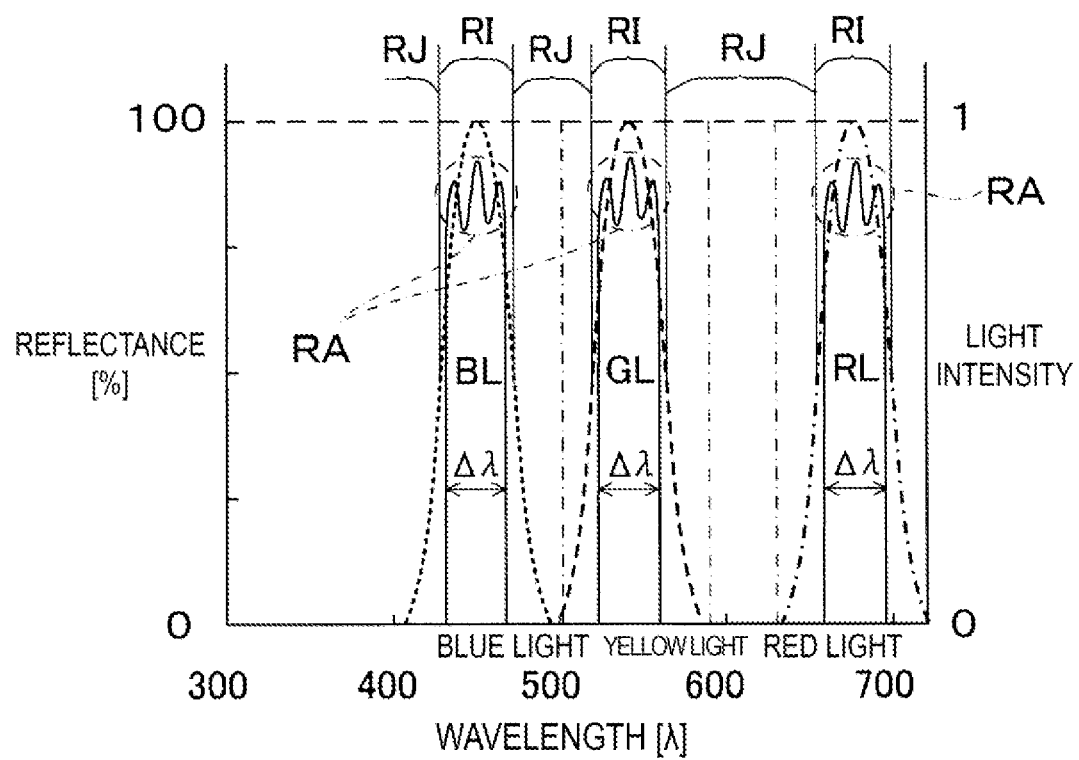
FIG. 9 is a drawing for describing a reflection property and the like of a partial reflective film of a fourth embodiment.

FIG. 9 is a drawing for describing a wavelength property of the image light ML emitted from the image light generation device 11 incorporated in the virtual image display device of the fourth embodiment, and a reflection property of the concave transmissive mirror 24. The wavelength of the image light ML emitted from the image light generation device 11 ranges from 426 nm to 472 nm for blue, ranges from 522 nm to 568 nm for green, and ranges from 650 nm to 704 nm for red. That is, the display wavelength regions RI of the colors are set to a wavelength 426 nm to 472 nm, a wavelength of 522 nm to 568 nm, and a wavelength of 650 nm to 704 nm. In comparison with the first embodiment, the central wavelength of blue is maintained at the original wavelength, the central wavelength of green is shifted to the long wavelength side by a shift amount of approximately 10 nm, and the central wavelength of red is shifted to the long wavelength side by a shift amount of approximately 60 nm. Accordingly, the partial reflective film 24b of the concave transmissive mirror 24 has the reflection property portion RA in a blue wavelength of 432 nm to 468 nm, a green wavelength of 526 nm to 564 nm, and a red wavelength of 654 nm to 700 nm.

In a traffic light, the main wavelength of the blue light is 503 nm, the main wavelength of the yellow light is 592 nm, and the main wavelength of the red light is 630 nm. On the other hand, although the wavelength of each color slightly varies depending on the standard, the wavelength of purple is said to be 380 to 430 nm, the wavelength of indigo 430 to 460 nm, the wavelength of blue 460 to 500 nm, the wavelength of green 500 to 570 nm, the wavelength of yellow 590 to 610 nm, the wavelength of orange 590 to 610 nm, and the wavelength of red 610 to 780 nm. In order not to miss the display of a traffic light, the concave transmissive mirror 24 must be able to transmit light of the light color, i.e., the see-through ensuring wavelength of a wavelength of 630 nm, a wavelength of 592 nm, and a wavelength of 503 nm, with sufficient transmittance. In view of this, in the present embodiment, the reflectance of the partial reflective film 24b is relatively high in the wavelength region shifted from the see-through ensuring wavelength. It can be seen that the concave transmissive mirror 24 having the reflection property illustrated in FIG. 9 efficiently transmits the red light, the yellow light, and the blue light, while reflecting blue or indigo with a wavelength of 432 nm to 468 nm, green with a wavelength of 526 nm to 564 nm, and red with a wavelength of 654 nm to 700 nm. In the example illustrated in the drawing, the wavelength range of the display wavelength region RI of the image light generation device 11 or the reflection property portion RA of the concave transmissive mirror 24 has a difference of approximately 20 nm from the display wavelength of the traffic light, and it is thus possible to sort the display color of the image light and the light color of the traffic light, by reflection. Desirably, the wavelength range of the display wavelength region RI of the image light generation device 11 or the reflection property portion RA of the concave transmissive mirror 24 is set to a value shifted by approximately 10 nm to 30 nm from the main wavelength of the light color of the traffic light.

While the reflection property of the concave transmissive mirror 24 is set in consideration of the traffic light in the above-described example, but the concave transmissive mirror 24 may have the function of transmitting light of specific wavelength related to other alarms, and the like.

Fifth Embodiment

A virtual image display device of a fifth embodiment is described below. The virtual image display device and the like of the fifth embodiment are obtained by partially changing the virtual image display device of the first embodiment, and therefore the description for the common portions is omitted.

Figure 10:
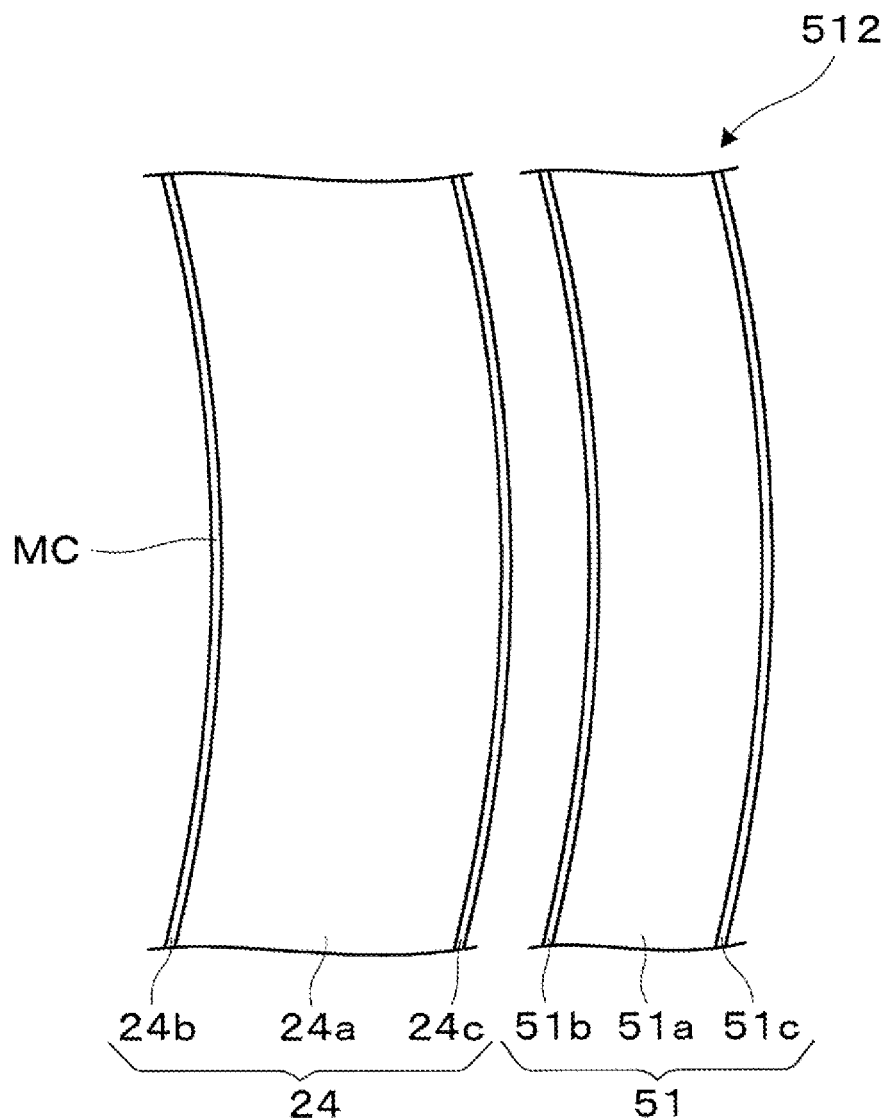
FIG. 10 is an enlarged sectional view illustrating a concave transmissive mirror and the like of a fifth embodiment.

With reference to FIG. 10, an optical unit 512 incorporated in the virtual image display device of the fifth embodiment is described below. FIG. 10 is an enlarged sectional view illustrating a region around the concave transmissive mirror 24 in the optical unit 512.

A shade 51 is disposed on the external side of the concave transmissive mirror 24. The shade 51 is detachably fixed to an eyeglass-frame shaped portion provided in the display driving part 102 illustrated in FIG. 1 in such a manner that it faces the concave transmissive mirror 24 with a space therebetween. The concave transmissive mirror 24 has the same structure as that described in the first embodiment or the third embodiment.

Figure 4:
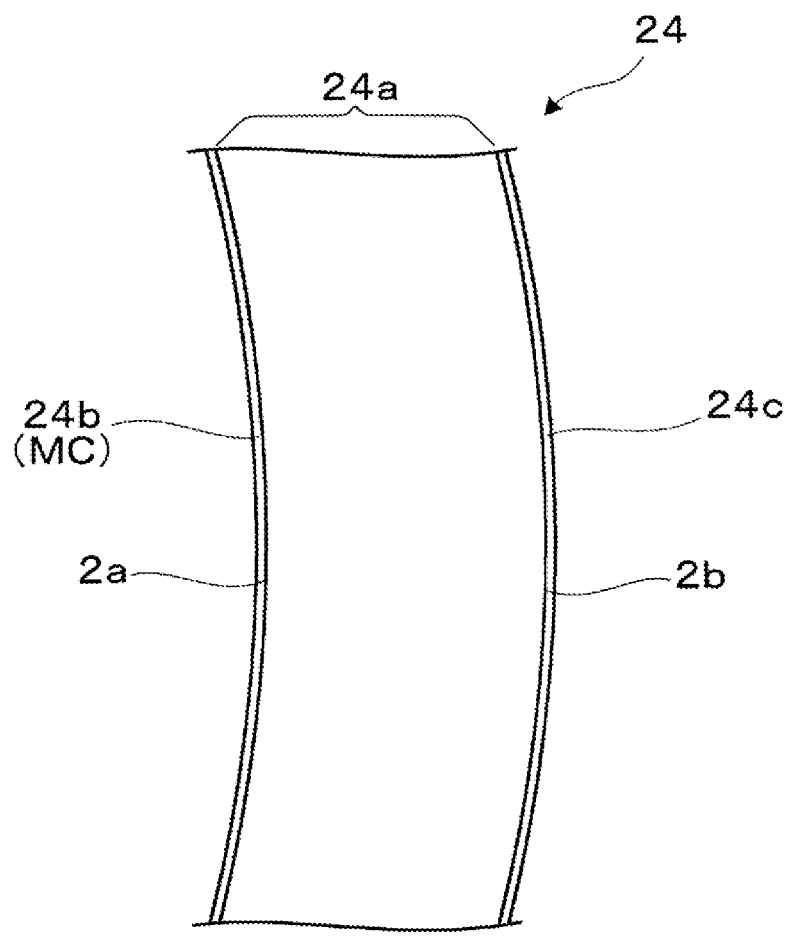
FIG. 4 is an enlarged sectional view illustrating a concave transmissive mirror.

The concave transmissive mirror 24 has the same structure as that illustrated in FIG. 4, and has the reflection property illustrated in FIG. 6, for example.

The shade 51 includes a plate-shaped member 51a that is a supporting member, an anti-reflective film 51b formed on the inner side of the plate-shaped member 51a, and a partial reflective film 51c formed on the external side of the plate-shaped member 51a. The partial reflective film 51c suppresses entry, into the concave transmissive mirror 24, of light having the same wavelength as that of the image light ML, in the external light OL. The wavelength property of the reflectance of the partial reflective film 51c is the same as the wavelength property the reflectance of the partial reflective film 24b of the concave transmissive mirror 24. To be more specific, the partial reflective film 24b is set to have a reflectance as high as 70% or higher in the display wavelength region RI of each of the RGB, and a transmissive reflectance of approximately 20 to 70% in a region between the RGB or the other wavelength region RJ on the outside thereof. The partial reflective film 24b does not completely block the external light OL in each display wavelength region RI, thus slightly generating leaked light. The partial reflective film 51c suppresses incidence and transmission of the external light OL of the display wavelength region RI at the partial reflective film 24b. With the partial reflective film 51c, it is possible to more reliably prevent a phenomenon in which the external light OL hinders the observation of the image light ML. The partial reflective film 51c suppresses the leakage of the image light ML to the external side by attenuating the image light ML passed through the partial reflective film 24b.

In the shade 51, the plate-shaped member 51a may function as the emission light absorption member 42 as with the plate-shaped member 124a illustrated in FIG. 7. With the plate-shaped member 51a that functions as the emission light absorption member 42, the passage of the external light OL and/or the image light ML can be further limited.

In the shade 51, the emission light absorption film 45 may be provided on the external side of the plate-shaped member 51a as with the concave transmissive mirror 224 illustrated in FIG. 7. With the emission light absorption film 45, the passage of the external light OL can be further limited.

Figure 11:
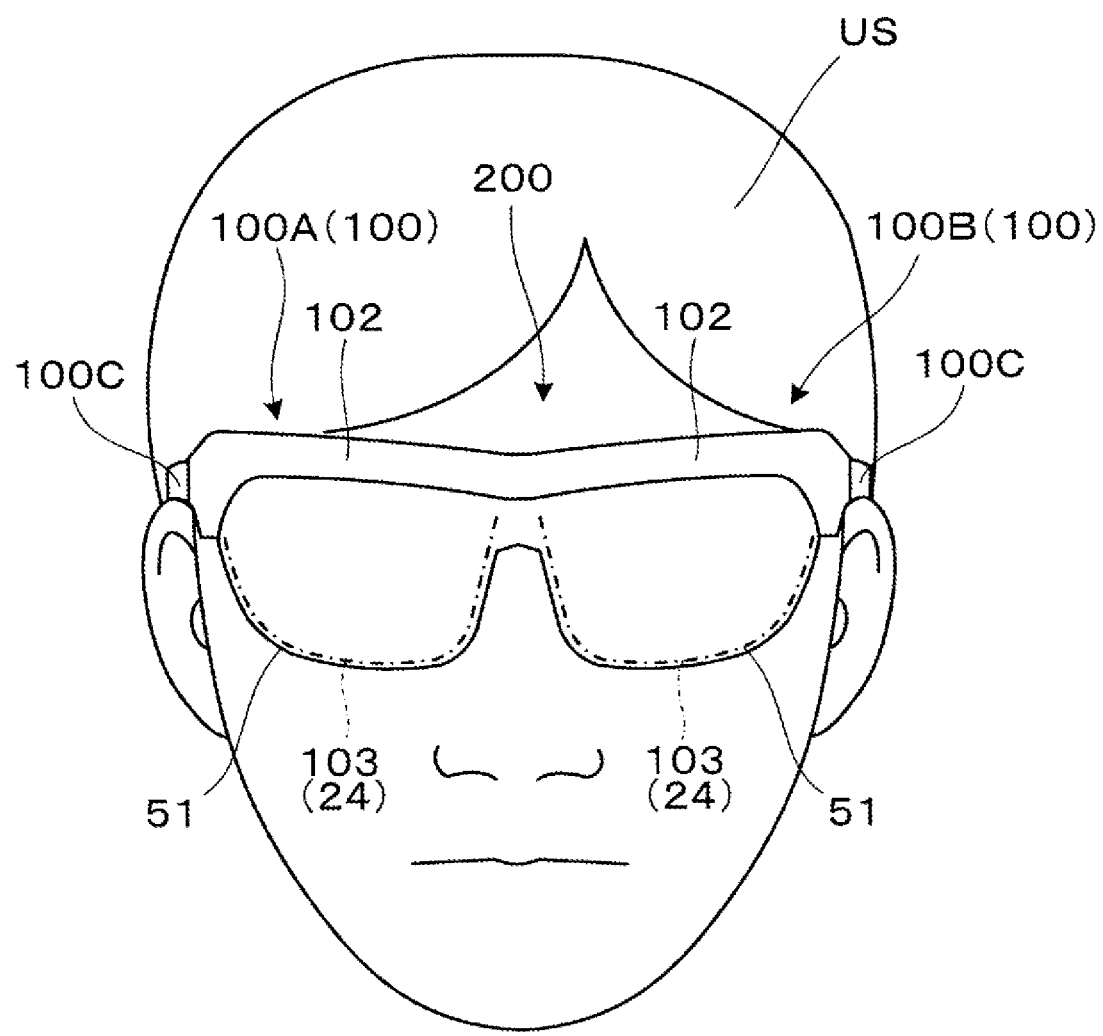
FIG. 11 is a front view for describing installation of a shade.

As illustrated in FIG. 11, the shade 51 is detachably fixed to a frame-shaped portion provided in the display driving part 102. The shade 51 covers the entirety the exterior member 103 including the concave transmissive mirror 24. As a result, the shade 51 is provided in a region that covers the plate-shaped member 24a or the partial reflective film 24b formed on the inner side of the concave transmissive mirror 24. In the case where the partial reflective film 24b is provided in the concave transmissive mirror 24, the shade 51 is provided in a region that covers the partial reflective film 24b. As described above, by completely covering the partial reflective film 24b with the shade 51, the image light ML is less seen from the outside. It is to be noted that in the case where the partial reflective film 24b is not formed in the entire region of the concave transmissive mirror 24, the shade 51 may also cover a small region facing the partial reflective film 24b.

Sixth Embodiment

A virtual image display device of a sixth embodiment is described below. The virtual image display device and the like of the sixth embodiment are obtained by partially changing the virtual image display device of the first embodiment, and therefore the description for the common portions is omitted.

Figure 12:
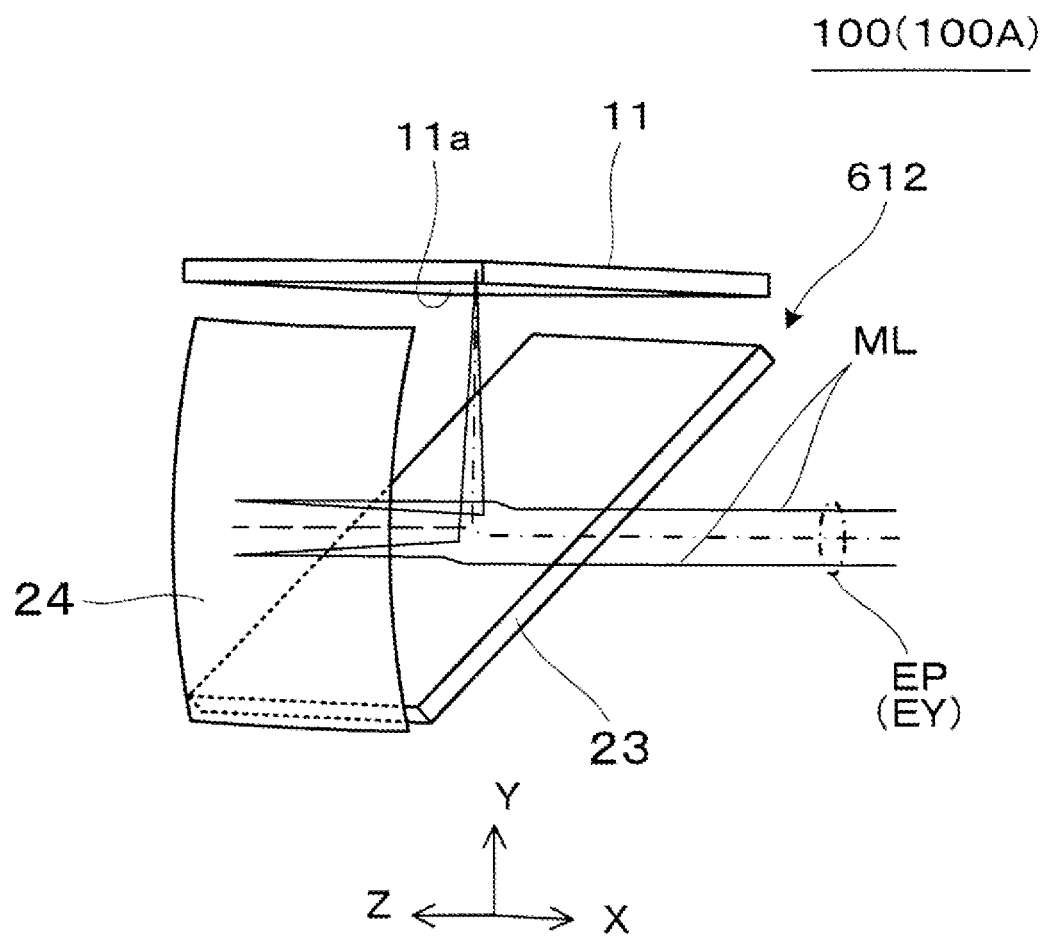
FIG. 12 is a schematic perspective view for describing a structure of a virtual image display device of a sixth embodiment.
Figure 13:
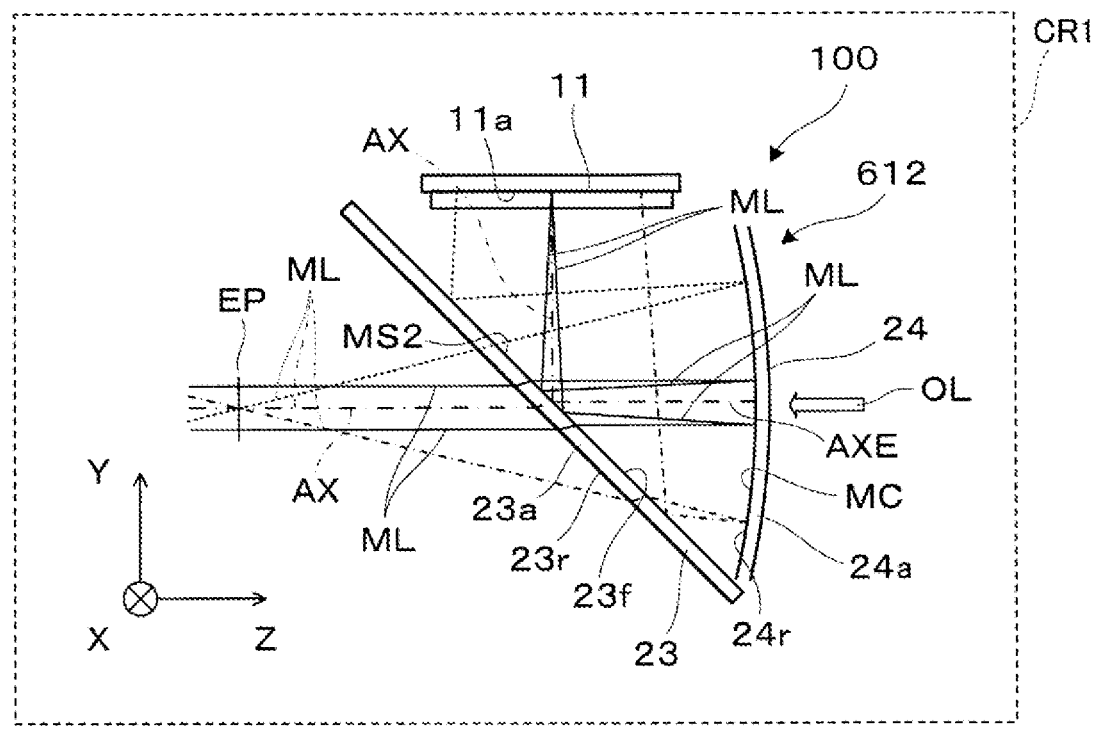
FIG. 13 is a side sectional view and a partial sectional plan view of the virtual image display device of FIG. 12.
Figure 13:
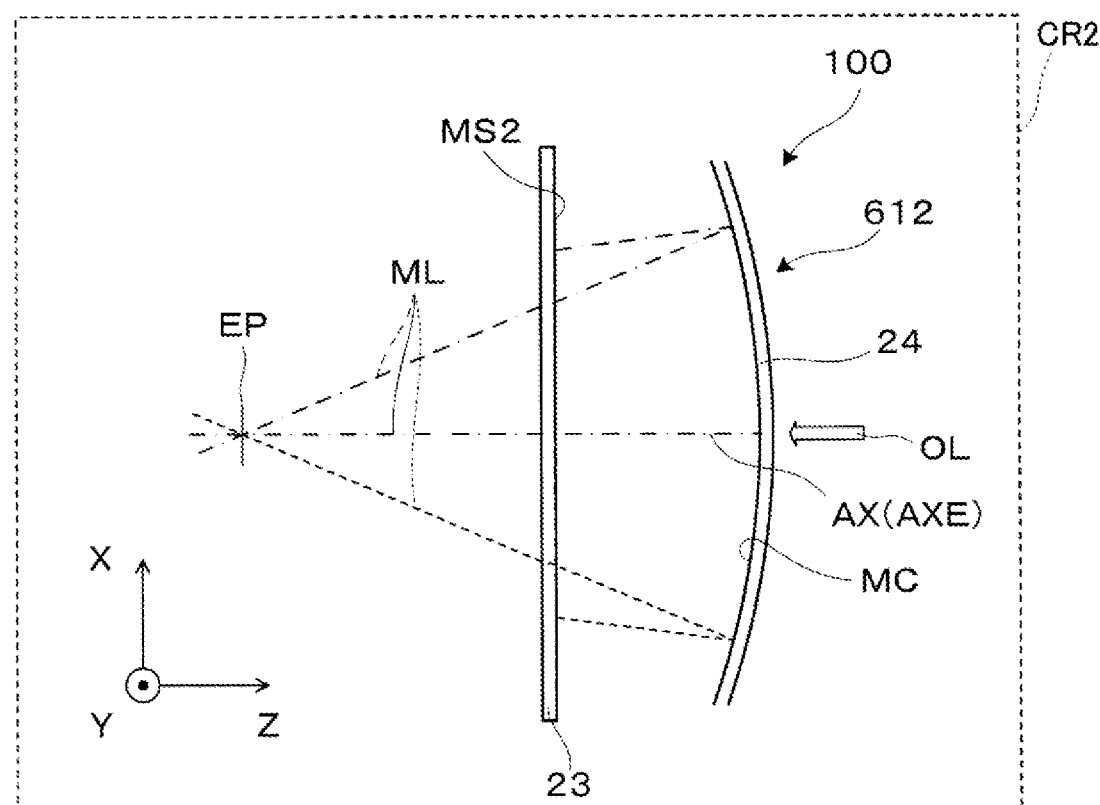

With reference to FIG. 12 and FIG. 13, the virtual image display device of the sixth embodiment is described below. FIG. 12 is a schematic perspective view for describing a structure of the virtual image display device 100. In FIG. 13, a first region CR1 is a side view of the image light generation device 11 and the optical unit 612, and a second region CR2 is a plan view illustrating a partial cross section along light paths of the image light generation device 11 and the optical unit 612.

The optical unit 612 includes the transmissive tilted mirror 23 and the concave transmissive mirror 24. Specifically, in the virtual image display device of the sixth embodiment, the image light ML is caused to impinge on the concave transmissive mirror 24 without forming an intermediate image.

Regarding the light paths, the image light ML from the image light generation device 11 impinges on the transmissive tilted mirror 23. The image light ML that is reflected by, for example, approximately 50% at the transmissive tilted mirror 23 impinges on the concave transmissive mirror 24 so as to be almost completely reflected by the partial reflective surface MC. The image light ML reflected by the concave transmissive mirror 24 impinges on the exit pupil EP where the eye EY or the pupil hole of the wearer US is located. External light OL transmitted through the concave transmissive mirror 24 also impinges on the exit pupil EP. That is, the wearer US wearing the HMD 200 can observe a virtual image of the image light ML superimposed on external images.

The optical unit 612 has the same cross-sectional structure of the concave transmissive mirror 24 as those illustrated in FIGS. 4 and 7 and the like, and the reflectance is high in the wavelength range of the image light ML. In addition, the shade 51 illustrated in FIG. 10 may be detachably disposed on the external side of the concave transmissive mirror 24.

Seventh Embodiment

A virtual image display device of a seventh embodiment is described below. The virtual image display device and the like of the seventh embodiment are obtained by partially changing the virtual image display device of the first embodiment, and therefore the description for the common portions is omitted.

Figure 14:
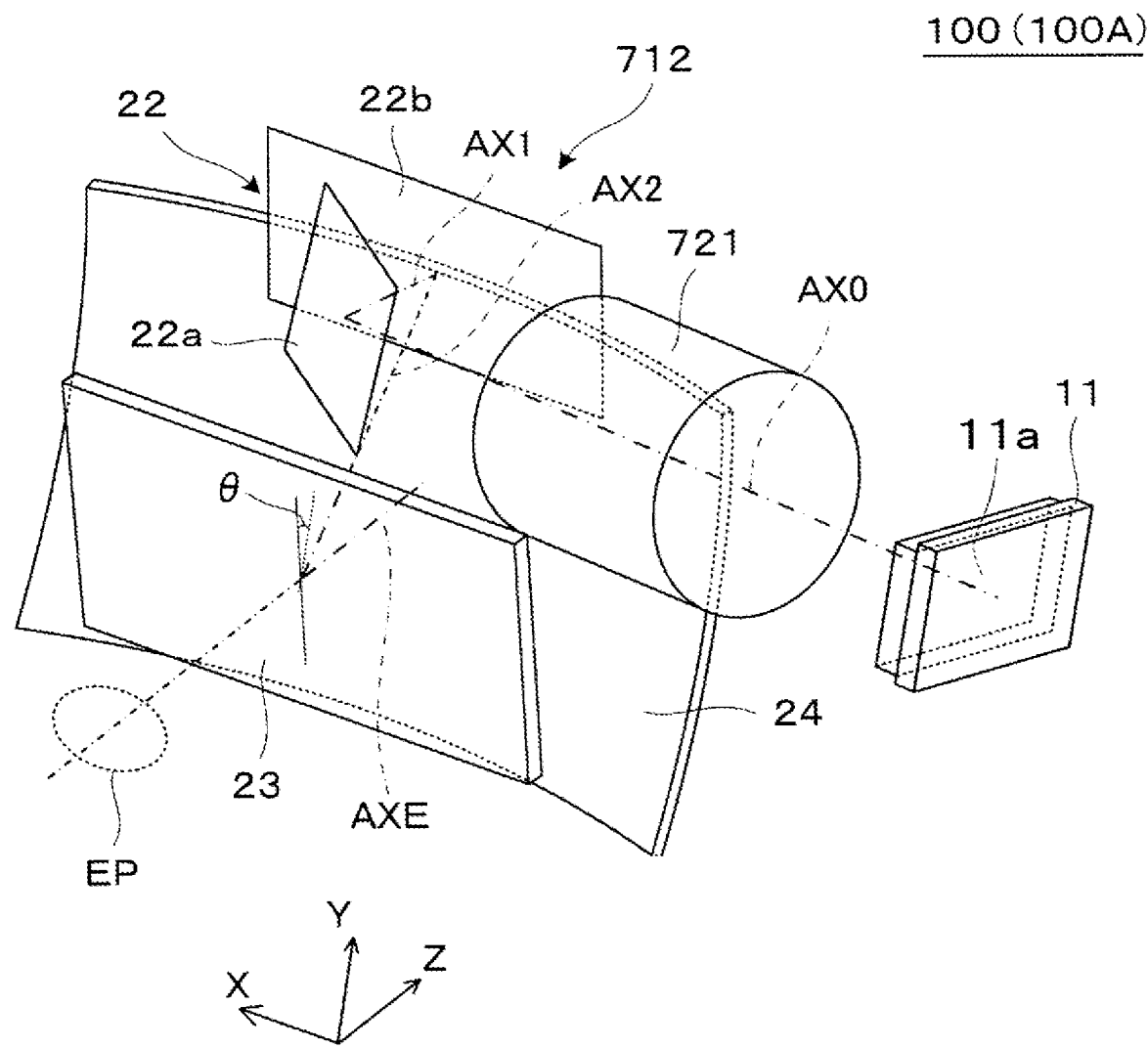
FIG. 14 is a schematic perspective view for describing a structure of a virtual image display device of a seventh embodiment.

With reference to FIG. 14, the virtual image display device of the seventh embodiment is described below. An optical unit 712 includes a projection optical system 721, a turning mirror 22, the transmissive tilted mirror 23, and the concave transmissive mirror 24. Specifically, the turning mirror 22 is disposed between the projection optical system 721 and the transmissive tilted mirror 23.

The turning mirror 22 includes a first mirror 22a and a second mirror 22b in the order of the light path from the image light generation device 11. The turning mirror 22 reflects the image light ML from the projection optical system 721 in the intersection direction. On the light emission side of the second mirror 22b, the transmissive tilted mirror 23 is disposed. A projection optical axis AX0, which is the optical axis of the projection optical system 721, extends in parallel to the X-axis direction of the lateral direction. The light path is bent by the first mirror 22a along the reflection optical axis AX1 from the projection optical axis AX0, and the light path is bent by the second mirror 22b along the reflection optical axis AX2 from the reflection optical axis AX1. As a result, the optical axis extended in a substantially horizontal direction on the emission side of the projection optical system 721 extends in a substantially vertical direction on the incident side of the transmissive tilted mirror 23.

With respect to the XY plane extending in the vertical direction as a reference, the transmissive tilted mirror 23 is tilted at an angle θ=approximately 20 to 40° in the counterclockwise direction around the X axis as viewed from the −X side. The light path from the image light generation device 11 to the turning mirror 22 is disposed on the upper side of the transmissive tilted mirror 23. To be more specific, the image light generation device 11, the projection optical system 21, and the turning mirror 22 are disposed in a space sandwiched between a tilted plane extended from the transmissive tilted mirror 23 and a vertical plane extended upward from the upper end of the concave transmissive mirror 24.

In the optical unit 712, the concave transmissive mirror 24 has the same cross-sectional structure as those illustrated in FIGS. 4 and 7 and the like, and the reflectance is high in the wavelength range of the image light ML. In addition, the shade 51 illustrated in FIG. 10 may be detachably disposed on the external side of the concave transmissive mirror 24.

Eighth Embodiment

A virtual image display device of an eighth embodiment is described below. The virtual image display device and the like of the eighth embodiment are obtained by partially changing the virtual image display device of the first embodiment, and therefore the description for the common portions is omitted.

Figure 15:
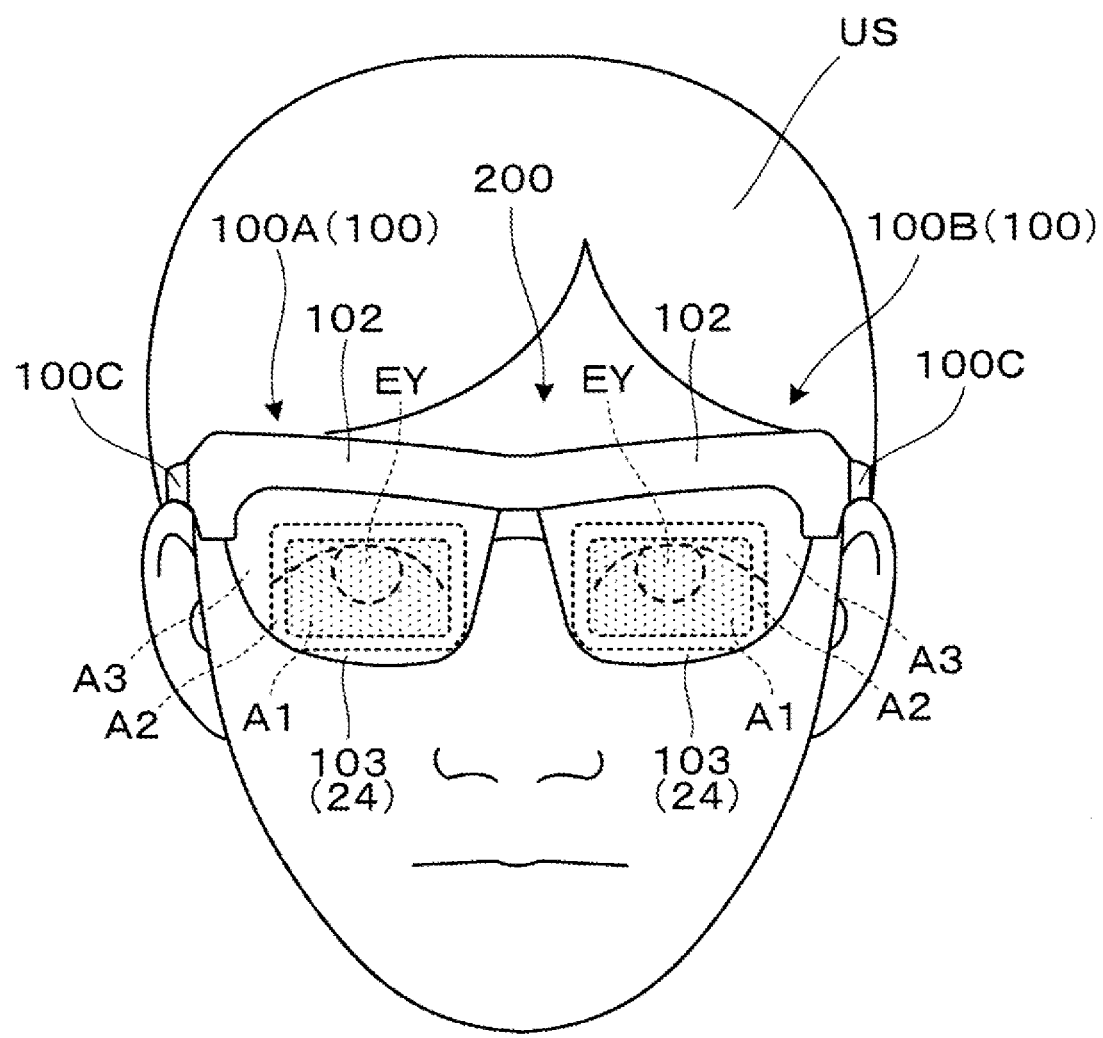
FIG. 15 is a front view for describing a virtual image display device of an eighth embodiment.

With reference to FIG. 15, the virtual image display device of the eighth embodiment is described below. In the present embodiment, the partial reflective surface MC may be formed in a region A1 that faces the transmissive tilted mirror 23 in the concave transmissive mirror 24. A reflectance transition region whose reflectance of the image light ML is gradually reduced with respect to the partial reflective surface MC may be formed in regions A2 and A3 around the region A1.

Modification and so Forth

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

While a self-luminous display device such as a micro LED display, and/or a light modulation element such as LCD is used as the image light generation device 11 in the virtual image display device 100 in the above-mentioned embodiment, it is also possible to adopt a configuration using a laser scanner including a combination of a laser light source and a scanner such as a polygon mirror, in place of the above-mentioned configuration. Specifically, the present disclosure is applicable to a head-mounted display of a laser retinal projection type.

The partial reflective film 24b of the concave transmissive mirror 24 may be formed of a diffraction grating. Also in this case, the reflectance in the display wavelength region RI corresponding to the image light ML is higher than the reflectance of the other wavelength region RJ.

The plate-shaped member 24a that constitutes the concave transmissive mirror 24 is not limited to a resin material, and may be formed of glass and/or synthetic quartz.

The optical unit 12 may be an optical system including a light guide, a prism, a complex of a prism and a mirror, and the like in the preceding stage of the transmissive tilted mirror 23.

In a specific aspect, a virtual image display device comprising: an image light generation device; a transmissive tilted mirror configured to reflect image light from the image light generation device; and a concave transmissive mirror configured to reflect, toward the transmissive tilted mirror, the image light reflected by the transmissive tilted mirror to form an exit pupil. The concave transmissive mirror includes a partial reflective film having a wavelength distribution on an inner side that faces the transmissive tilted mirror.

In the above-mentioned virtual image display device, since the concave transmissive mirror includes a partial reflective film having a wavelength distribution on the inner side that faces the transmissive tilted mirror, image light transmitted through the partial reflective film and emitted to the external side can be suppressed, and the image being displayed is less seen from the outside, thus increasing of the effect of suppressing information leakage. In particular, with the partial reflective film having a wavelength distribution, the transmissivity can be ensured for the wavelength other than the intended wavelength, and a see-through property can be ensured. It is to be noted that through the use of the transmissive tilted mirror, the weight of the optical system of the virtual image display device can be reduced in comparison with a case where a prism member is used.

In a specific aspect, the partial reflective film has such a property that a reflectance in a display wavelength region corresponding to the image light is higher than a reflectance in another wavelength region in a visible range excluding the display wavelength region. In this case, it is possible to increase the ease of the observation of the external light through the transmission at the partial reflective film while increasing the ease of the observation of image light through the reflection at the partial reflective film.

In another specific aspect, the partial reflective film substantially transmits light of the other wavelength region. In this case, the transmittance of the external light at the partial reflective film can be increased as much as possible in a wavelength range that does not affect the image light.

In still another specific aspect, the partial reflective film partially blocks light of the other wavelength region. In this case, the transmittance of the external light at the partial reflective film can be ensured in a wavelength range that does not affect the image light.

In still another specific aspect, the partial reflective film has a relatively high reflectance in a wavelength region shifted from a see-through ensuring wavelength. In this case, by shifting the image light from a typical wavelength range, the external light in a wavelength range that overlaps typical image light can be transmitted at the concave transmissive mirror, and the hindrance to intake of information that is deemed important can be prevented.

In still another specific aspect, the partial reflective film has a relatively high reflectance in a wavelength region shifted from the see-through ensuring wavelength by a shift amount of 30 nm or smaller.

In still another specific aspect, the concave transmissive mirror includes an anti-reflective film on an opposite side of a supporting member from the partial reflective film, the supporting member supporting the partial reflective film. In this case, the image light passed through partial reflective film can be prevented from being reflected on the side opposite to the supporting member, and the generation of ghost can be suppressed.

In still another specific aspect, the concave transmissive mirror reflects the image light toward the transmissive tilted mirror to form an exit pupil.

In still another specific aspect, the virtual image display device further includes a shade spaced apart from the concave transmissive mirror on the external side of the concave transmissive mirror. With the shade, the image light emitted to the external side can be suppressed.

In still another specific aspect, the shade is provided in a region that covers the partial reflective film provided on the inner side of the concave transmissive mirror.

In still another specific aspect, the shade includes a partial reflective film having a wavelength distribution. With the partial reflective film, the image light emitted to the external side can be suppressed.

In still another specific aspect, the concave transmissive mirror has a thickness of 2 mm or smaller. In this case, the weight of the mirror member can be reduced, and thus the weight of the optical system of the virtual image display device can be reduced.

In still another specific aspect, an emission light axis from the transmissive tilted mirror toward the concave transmissive mirror is set to a forward and downward direction with respect to a horizontal axis.

In still another specific aspect, the virtual image display device further includes a turning mirror configured to reflect, in an intersection direction, the image light from the image light generation device. In this case, it is possible to easily prevent the image light generation device and associated optical elements from largely protruding upward and rearward of the transmissive tilted mirror, and the virtual image display device can be downsized, thus achieving a slender exterior appearance.

In still another specific aspect, the virtual image display device further includes a projection optical system disposed between the image light generation device and the transmissive tilted mirror and configured to form an intermediate image. In this case, the image quality can be increased while downsizing the image light generation device with the projection optical system.

In still another specific aspect, the image light impinges on the concave transmissive mirror without forming an intermediate image.

In a specific aspect, an optical unit includes a transmissive tilted mirror configured to reflect image light; and a concave transmissive mirror configured to reflect, toward the transmissive tilted mirror, the image light reflected by the transmissive tilted mirror to form an exit pupil. The concave transmissive mirror includes a partial reflective film having a wavelength distribution on an inner side that faces the transmissive tilted mirror.

In the above-mentioned optical unit, since the concave transmissive mirror includes a partial reflective film having a wavelength distribution on the inner side that faces the transmissive tilted mirror, image light transmitted through the partial reflective film and emitted to the external side can be suppressed, and the image being displayed is less seen from the outside, thus increasing of the effect of suppressing information leakage. In particular, with the partial reflective film having a wavelength distribution, the transmissivity can be ensured for the wavelength other than the intended wavelength, and a see-through property can be ensured. It is to be noted that through the use of the transmissive tilted mirror, the weight of the optical system of the virtual image display device can be reduced in comparison with a case where a prism member is used.

What is claimed is:

1. A virtual image display device comprising:
   an image light generation device generating image light;
   a first mirror reflecting the image light from the image light generation device; and
   a second mirror having a concave shape and reflecting, toward the first mirror, the image light reflected by the first mirror,
   wherein the second mirror includes a first reflective film on which the image light reflected by the first mirror is incident, the first reflective film has different reflectance according to wavelength.

2. The virtual image display device according to claim 1, wherein in a visible range, the first reflective film having a property that reflectance with respect to a first wavelength region corresponding to the image light is higher than reflectance with respect to a second wavelength region excluding the first wavelength region.

3. The virtual image display device according to claim 2, wherein the first reflective film substantially transmits light in the second wavelength region.

4. The virtual image display device according to claim 2, wherein the first reflective film transmits a part of light in the second wavelength region.

5. The virtual image display device according to claim 1, wherein the second wavelength region includes specific wavelength related to alarms,
the first wavelength region is shifted from the second wavelength.

6. The virtual image display device according to claim 5, wherein the first wavelength region is shifted from the second wavelength region by a shift amount of 30 nm or smaller.

7. The virtual image display device according to claim 1, wherein the second mirror includes a supporting member including a first surface and a second surface opposing to the first surface, the first reflective film is provided along the first surface of the support member, an anti-reflective film is provided along the second surface of the support member, the anti-reflective film reduces reflection of the image light through the first reflective film.

8. The virtual image display device according to claim 1, wherein the second mirror reflects the image light toward the first mirror to form an exit pupil.

9. The virtual image display device according to claim 1, further comprising a shade spaced apart from the second mirror,
wherein the second mirror is disposed between the first mirror and the shade.

10. The virtual image display device according to claim 9, wherein the shade covers the first reflective film.

11. The virtual image display device according to claim 9, wherein the shade includes a second reflective film having different reflectance according to wavelength.

12. The virtual image display device according to claim 1, wherein the second mirror has a thickness of 2 mm or smaller.

13. The virtual image display device according to claim 1, wherein an emission light axis extending from the first mirror toward the second mirror is inclined to downward direction with respect to a horizontal axis.

14. The virtual image display device according to claim 1, further comprising a third mirror reflecting, to an intersection direction, the image light from the image light generation device.

15. The virtual image display device according to claim 1, further comprising a projection optical system being disposed between the image light generation device and the first mirror, the projection optical system forming an intermediate image.

16. The virtual image display device according to claim 1, wherein the image light is entered to the second mirror without forming an intermediate image.

17. An optical unit comprising:
a first mirror reflecting an image light; and
a second mirror having a concave shape and reflecting, toward the first mirror, the image light reflected by the first mirror,
wherein the second mirror includes a reflective film on which the image light reflected by the first mirror is incident, the first reflective film has different reflectance according to wavelength.

* * * * *